April 16, 1929.    V. K. ZWORYKIN    1,709,762
INTERFEROMETER MICROPHONE
Filed Oct. 7, 1926

WITNESSES:
G. S. Neilson
W. H. ...

INVENTOR
Vladimir K. Zworykin
BY
Wesley ... Carr
ATTORNEY

Patented Apr. 16, 1929.

1,709,762

UNITED STATES PATENT OFFICE.

VLADIMIR K. ZWORYKIN, OF SWISSVALE, PENNSYLVANIA, ASSIGNOR TO WESTINGHOUSE ELECTRIC & MANUFACTURING COMPANY, A CORPORATION OF PENNSYLVANIA.

INTERFEROMETER MICROPHONE.

Application filed October 7, 1926. Serial No. 140,197.

This invention relates to devices by means of which sound may be translated into corresponding electrical changes. Such devices are ordinarily called microphones but my invention differs so radically from any form of microphone heretofore known that the name microphone unaccompanied by some other word would be misleading.

It is an object of my invention to produce a sound-translating device which shall be free from parts that move in response to sound, and thereby to produce a sound-translating device which is independent of all inertia effects.

It is a further object of my invention to produce an instrument which will respond to sound by causing optical changes corresponding to the sound.

It is a further object of my invention to produce a sound-responsive device which does not abstract energy from the sound.

It is a further object of my invention to take advantage of the fact that the index of refraction of the atmosphere changes with its density. Particularly, as the density of the air changes during the propagation of a sound wave, corresponding changes in the index of refraction occur and it is an object of my invention to take advantage of this circumstance.

It is a further object of my invention to provide an interferometer in which one of the two approximately equal light-paths is open to sound and the other sheltered from sound.

It is a further object of my invention to cause the movement of the fringes produced by an interferometer to result in changes in the illumination of a light-sensitive device.

It is a further object of my invention to provide a mask, for co-operation with the fringes produced by the interferometer, through which the quantity of light which will be permitted to pass, shall be in accordance with the position of the fringes.

It is a further object of my invention to so combine such an interferometer with such a mask that the quantity of light passing the mask shall be in accordance with the sound.

Figure 1:
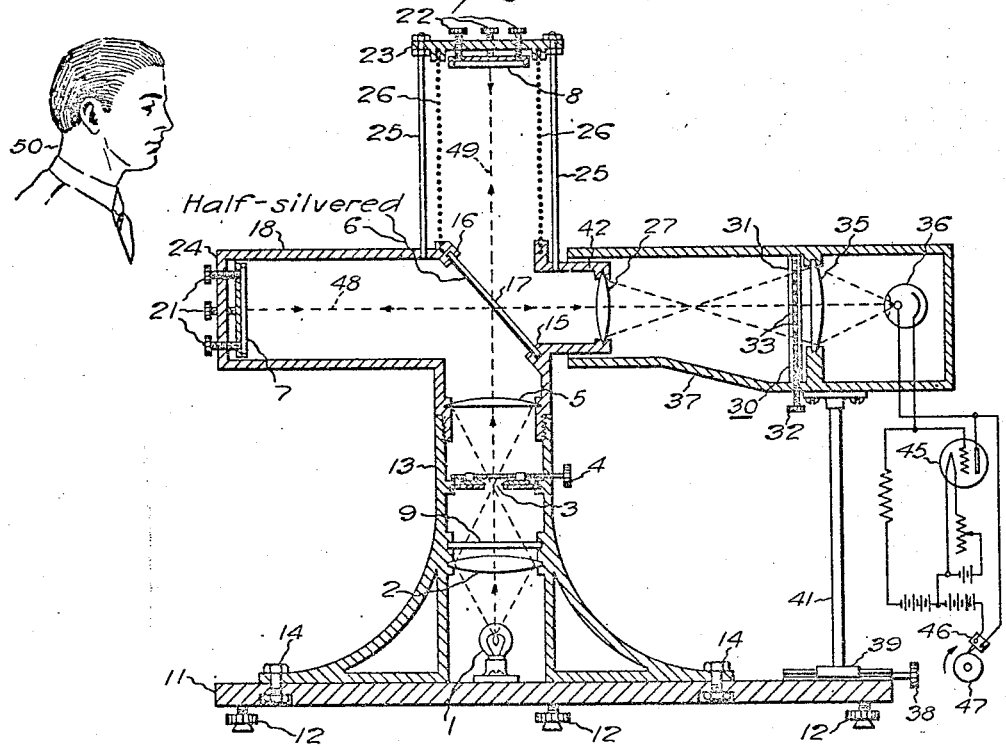
Figure 2:
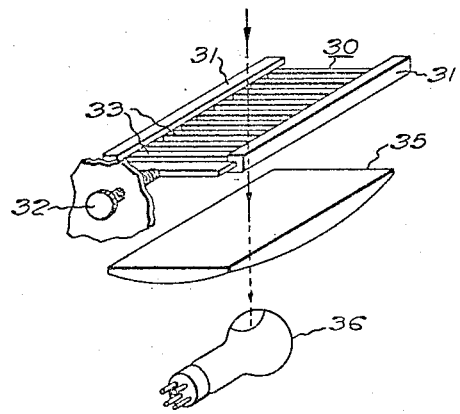

Other objects of my invention will be apparent from the following detailed description and the accompanying drawings in which Figure 1 is a vertical section through the instrument, and Fig. 2 is a diagrammatic view illustrating the relation of the mask to the light-sensitive device.

The apparatus includes an interferometer which is supplied with light from the light source 1. The light is concentrated by means of a lens 2 upon a slit 3. The width of this slit may be adjusted in any well known manner. The means for adjustment chosen for illustration is controlled by the milled head 4. The light from the slit 3 is rendered parallel by means of a lens 5. The slit 3 is therefore located at the principal focus of the lens 5.

The beam of parallel rays of light impinges upon the half-silvered mirror 6. When monochromatic light is to be used, a filter 9 is mounted in proximity to the lens 2.

Two mirrors 7 and 8, properly positioned with respect to the half-silvered mirror 6, constitute the essential elements of the interferometer. It is important that these mirrors be held constantly in the correct relative position. It is also important that the system of three mirrors be stationary relative to the remaining parts of the apparatus.

For this reason, the apparatus is mounted upon a rugged base 11 which is formed in any convenient manner that will minimize vibration. For the purpose of illustration, I have shown a three-point support afforded by three levelling screws 12. It is not, however, important that the apparatus be accurately level.

From the base 11, a strongly braced tube 13 extends upward. The bracing is preferably secured to the base 11, for example, by bolts 14. The lens 2, slit 3 and lens 5 are mounted in the tube 13. The supports 15 and 16 for the glass plate 17, which carries the half-silvered surface 6, are preferably integral with the tube 13.

A lateral tube 18, rigidly connected to, or integral with, the tube 13, is provided to support the mirror 7. The mirror is provided with screws 21 for accurately adjusting its position relative to the half-silvered mirror 6.

The mirror 8 is similarly provided with adjusting screws 22 which are mounted in a plate 23 corresponding to the end 24 of the tube 18. The plate 23 is not, however, supported by a tube. It is supported by any form of open work which will not interfere with the passage of sound. This open work is illustrated by rods 25 mounted in the integral member constituting the tubes 13 and 18. The plate 23, into which the upper ends of the rods 25 are fastened, serves to anchor these rods to one another and to make of the whole open work a rigid construction which will prevent vibration of the mirror 8 relative to the half-silvered mirror 6.

Supported in any convenient manner, preferably within the open work, is a tube 26 of thin silk or other fabric which will largely exclude light and will not interfere with the passage of sound.

The light from the interferometer is focused by means of a lens 27. The fringes produced by the action of the interferometer are thereby rendered sharp in a plane, on the other side of the lens 27 from the half-silvered mirror.

In this plane, a mask 30 is mounted, preferably in guides 31, whereby it may be adjusted by means of the screw 32 without displacing it from the plane in which the fringes are sharp. The mask 30 consists of strips of opaque material 33 separated by transparent portions. The opaque bodies 33 may be bars of material, constituting a body like a grate, or they may be strips of opaque pigment upon a glass plate or they may even be rulings made by engraving a glass plate. As shown in the drawing, the bodies 33 are bars, and the transparent portions are open spaces between the bars.

On the other side of the mask 30 from the lens 27, a lens 35 is located for the purpose of concentrating the light which passes through the mask upon a photo-electric cell 36.

The mask 30, lens 35 and cell 36 are mounted together in a tube 37 which may be adjusted relative to the lens 27. This adjustment is provided for by means of the milled head 38 which moves the foot 39 of a standard 41 by any well known slow-motion device. The standard 41 carries the tube 37 and the parts therein.

The tube 37 is guided in its movement by the stub 42 which is integral with the tubes 13 and 18. The stub 42 serves also as a support for the lens 27. In the drawing, the clearance between the tube 37 and the stub 42 is greatly exaggerated to clearly indicate that the tube 37 is movable. In the actual structure, the fit between the stub 42 and the tube 37 will be as close as it can be made without introducing an undesirably large degree of friction.

From the photo-electric cell 36, leads extend outside of the tube 37 to an amplifier 45 and, from the amplifier, to any desired translating device. For the sake of a specific illustration, the drawing shows an engraving instrument 46 for acting upon a phonograph record 47 but the invention is not limited to such translating device.

In the operation of the device, light from the lamp 1 and the color screen 9, co-operating with the lens 5, produces a beam of parallel rays which is divided by the half-silvered mirror 6, part of the light passing to the mirror 7, and part to the mirror 8. After reflection from these mirrors, the two parts of the light combine and pass through the lens 27 to the mask 30.

The two beams of light, into which the half-silvered mirror 6 divided the original beam, produces interference in a way which is well understood, and the interference results in fringes in the plane of the mask 30. The paths of the light are indicated by the dotted lines and its direction by the arrowheads. It will be noted that there are two portions 48 and 49 of the light-path over which the light passes in both directions. The effective optical length of these portions is dependent on the index of refraction of the air therein, and the position of the fringes depends on the difference of length in the two light paths and thus on the index of refraction in the two places 48 and 49.

The opaque portions of the mask 30 are so positioned that they coincide with the fringes in the position which they occupy when the air in the tube 18 and inside the silk sleeve 26 is of the same density. Under these circumstances, therefore, no light passes beyond the mask 30, and the photo-electric cell 36 is not illuminated.

When sound, for example, the voice of a speaker 50, reaches the instrument it causes a periodic change in the density of the air within the sleeve 26 which is, of course, accompanied by a corresponding periodic change in the index of refraction of the air there. The difference in index of refraction of the air in the two optical paths is equivalent, in optical effect, to a change in the length of one path relative to that of the other and, consequently, produces a shifting of the fringes.

When the fringes shift they no longer coincide with the bars 33 and, consequently, send more or less light through the openings between the bars. Some light, therefore, passes the mask 30 when sound impinges upon the instrument, and the quantity of light passing the instrument is proportional to the difference in density at that instant between the air under the influence of sound and the air sheltered from sound.

The light which passes the mask 30 is concentrated, by means of the lens 35, upon the photo-electric cell 36. The effect of the lens is, therefore, to increase the changes in illumination which occur at the cell 36. These changes are also larger with monochromatic light than with white light, because the fringes are more definitely positioned when a single wave-length is used. The light will be monochromatic if the light filter 9 is in place.

The changes in the illumination of the photo-electric cell 36 give rise to changes in potential which are amplified by the vacuum tube 45 and thereby produce changes in current through the translating device 46.

As an illustration of one use of this instrument, I have shown the translating device 46 as the stylus-operating portion of a phonographic recorder but my invention is not limited to this application. The invention possesses special advantages for the making of phonograph records because the studios in which such records are made will afford a permanent place for the instrument, so that a sufficiently stable foundation may be supplied for the feet 12 without difficulty. The same considerations show that the apparatus is particularly useful in the studios of permanent broadcasting stations.

Because the apparatus involves no moving parts, it is free from any special resonance periods or other effect of inertia. Because the body of air between the half-silvered mirror and the mirror 8 is unconfined, no resonance will be set up therein, as there would be if a closed chamber, such as is present in most microphones, were used.

The separation of the amplifier 45 from the photo-electric cell 36 is preferred over the construction of a combined photo-electric cell and amplifier in one tube because the microphonic effects present in the combined tube are thereby avoided.

Although I have illustrated but a single specific embodiment of my invention, it will be apparent to those skilled in the art that many variations, both in the details of construction and in the application of the principle, are contemplated, and no limitations, except such as are necessitated by the prior art or required by the claims herein, are intended.

I claim as my invention:

1. In a sound-translating device, an interferometer, one arm of which is more exposed to the sound than the other arm, and means responsive to the resulting movement of the fringes for producing effects corresponding to the sound.

2. In a sound-translating device, means for producing optical interference fringes, said means including provisions for shifting the position of said fringes in response to sound, a light-responsive device, and means for controlling the illumination of said light-responsive device in accordance with the position of the fringes.

3. In combination, means for producing optical interference fringes and a mask having transparent and opaque elements spaced as are the fringes, said mask being positioned in the path of the light from said fringes.

4. In combination, means for producing optical interference fringes, a mask having transparent and opaque elements spaced as are the fringes, said mask being positioned in the path of the light from said fringes, and a light-sensitive device on the side of said mask opposite the fringe-producing means, whereby departure of the fringes from normal position will alter the illumination of said light-sensitive device.

5. In a sound-translating device, an interferometer, one arm of which is exposed to sound and one arm sheltered from sound, whereby the fringes will be displaced in accordance with sound, a mask in the path of the light from said fringes, said mask including opaque bars separated by transparent portions, the spacing of said bars corresponding to the spacing of the fringes, whereby the amount of light traversing said mask will correspond to the sound, a photo-electric device and means for concentrating the light traversing said mask upon said photo-electric device.

6. In a sound-translating device, an interferometer, including a mirror, open work supporting said mirror, whereby the light-path including said mirror is influenced by sound, a second mirror, a support therefor impervious to sound, whereby the light-path including said second mirror, is uninfluenced by sound and a half-silvered mirror at the junction of said light-paths, whereby the fringes will be shifted by the sound, and a translating device controlled by the movement of the fringes.

In testimony whereof, I have hereunto subscribed my name this 2nd day of October, 1926.

VLADIMIR K. ZWORYKIN.